US009014449B2

(12) United States Patent
Zhong et al.

(10) Patent No.: US 9,014,449 B2
(45) Date of Patent: Apr. 21, 2015

(54) METHOD AND SYSTEM FOR SEGMENTATION AND REMOVAL OF PULMONARY ARTERIES, VEINS, LEFT ATRIAL APPENDAGE

(71) Applicant: Siemens Aktiengesellschaft, Munich (DE)

(72) Inventors: Hua Zhong, Pittsburgh, PA (US); Yefeng Zheng, Dayton, NJ (US); Gareth Funka-Lea, Cranbury, NJ (US); Fernando Vega-Higuera, Erlangen (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 365 days.

(21) Appl. No.: 13/629,815

(22) Filed: Sep. 28, 2012

(65) Prior Publication Data

US 2013/0083983 A1    Apr. 4, 2013

Related U.S. Application Data

(60) Provisional application No. 61/542,913, filed on Oct. 4, 2011.

(51) Int. Cl.
*G06K 9/00* (2006.01)
*G06T 7/00* (2006.01)
*G06K 9/36* (2006.01)

(52) U.S. Cl.
CPC ........ *G06T 7/0081* (2013.01); *G06K 2009/366* (2013.01); *G06T 7/0087* (2013.01); *G06T 2200/04* (2013.01); *G06T 2207/10081* (2013.01); *G06T 2207/20076* (2013.01); *G06T 2207/20081* (2013.01); *G06T 2207/30048* (2013.01); *G06T 2207/30101* (2013.01)

(58) Field of Classification Search
None
See application file for complete search history.

(56) References Cited

U.S. PATENT DOCUMENTS

| 7,916,919 | B2   | 3/2011 | Zheng et al. |         |
|-----------|------|--------|--------------|---------|
| 7,970,189 | B2   | 6/2011 | Buelow et al.|         |
| 8,218,845 | B2 * | 7/2012 | Lynch et al. | 382/131 |
| 2007/0019861 | A1 * | 1/2007 | Zwanger  | 382/171 |
| 2009/0154785 | A1 * | 6/2009 | Lynch et al. | 382/131 |

(Continued)

OTHER PUBLICATIONS

Zheng et al., Four-chamber heart modeling and automatic segmentation for 3D cardiac CT volumes using marginal space learning and steerable features, IEEE Trans. Medical Imaging, 27(11):1668-1681, 2008.*

(Continued)

*Primary Examiner* — Matthew Bella
*Assistant Examiner* — Jason Heidemann (57) ABSTRACT

A method and system for segmentation and removal of pulmonary arteries, pulmonary veins, and a left atrial appendage from 3D medical image data, such as 3D computed tomography (CT) volumes, is disclosed. A global shape model is segmented for each of pulmonary arteries, pulmonary veins, and a left atrial appendage in a 3D volume. The segmented global shape model for each of the pulmonary arteries, pulmonary veins, and left atrial appendage is locally refined based in local voxel intensities in the 3D volume, resulting in a respective mask for each structure. The mask is used to remove voxels belonging to the pulmonary arteries, pulmonary veins, and left atrial appendage from the 3D volume in order to better visualize coronary arteries and bypass arteries.

35 Claims, 6 Drawing Sheets

(56) References Cited

U.S. PATENT DOCUMENTS

| | | |
|---|---|---|
| 2010/0239147 A1* | 9/2010 | Vitanovski et al. ........... 382/131 |
| 2010/0239148 A1 | 9/2010 | Zheng et al. |
| 2010/0296709 A1* | 11/2010 | Ostrovsky-Berman et al. ............ 382/128 |
| 2011/0051885 A1 | 3/2011 | Buelow et al. |
| 2011/0096964 A1 | 4/2011 | Zheng et al. |
| 2012/0134564 A1 | 5/2012 | Zheng et al. |
| 2012/0230570 A1 | 9/2012 | Zheng et al. |

OTHER PUBLICATIONS

Zheng et al.Fast and automatic heart isolation in 3D CT volumes: Optimal shape initialization. In Proc. Int'l Workshop on Machine Learning in Medical Imaging (In conjunction with MICCAI), 2010.*

Zhang et al.Segmentation of Pulmonary Artery based on CT Angiography Image., Oct. 21-23, 2010, Chinese Conference on Pattern Recognition (CCPR), pp. 1-5.*

* cited by examiner

METHOD AND SYSTEM FOR SEGMENTATION AND REMOVAL OF PULMONARY ARTERIES, VEINS, LEFT ATRIAL APPENDAGE

This application claims the benefit of U.S. Provisional Application No. 61/542,913, filed Oct. 4, 2011, the disclosure of which is herein incorporated by reference.

BACKGROUND OF THE INVENTION

The present invention relates to cardiac imaging, and more particularly, to segmentation of pulmonary arteries, veins, and the left atrial appendage for improved visualization of coronary arteries and bypass arteries.

Coronary Artery Disease (CAD) or Coronary Heart Disease (CHD) is the leading cause of death in the world. CAD/CHD is caused by accumulation of plaque in coronary arteries. Eventually such plaque blocks or reduces blood flow to heart muscles. Deprived of oxygen, the myocardium becomes damaged and other heart diseases may develop, as well. A typical early symptom for CAD/CHD is chest pain, which can easily be mistaken for other less serious diseases until a patient experiences a heart attack.

Cardiac computed tomography (CT) is often used for diagnosis and treatment planning for CAD/CHD. In cardiac CT images, not only the heart is imaged, but also surrounding anatomical structures that can block the direct view of the heart in a 3D visualization. Various algorithms have been developed to isolate the heart from surrounding structures, such as the lungs, spine, and sternum, in a 3D CT volume. However, heart structures like the pulmonary arteries, pulmonary veins, and left atrial appendage may still partially occlude the coronary arteries in the isolated heart visualization. Accordingly, it is desirable to remove these three structures so that physicians can more easily visualize the coronary arteries.

BRIEF SUMMARY OF THE INVENTION

The present invention provides a method and system for segmenting pulmonary arteries (PA), pulmonary veins (PV), and the left atrial appendage (LAA) in a 3D heart isolation image extracted from a 3D medical image data, such as a 3D computed tomography (CT) volume. Embodiments of the present invention remove the segmented PA, PV and LAA from a heart isolation image in order to better visualize coronary arteries and bypass arteries. Embodiments of the present invention combine global shape models with local region growing in order to segment the PA, PV, and LAA.

In one embodiment of the present invention, at least one of a pulmonary artery shape model, a pulmonary vein shape model, and a left atrial appendage shape model is segmented in the 3D volume. At least one of a pulmonary artery mask, a pulmonary vein mask, and a left atrial appendage mask is generated by locally refining the segmented at least one of a pulmonary artery shape model, a pulmonary vein shape model, and a left atrial appendage shape model based on local voxel intensities in the 3D volume. Voxels included in the at least one of a pulmonary artery mask, a pulmonary vein mask, and a left atrial appendage mask can be removed from the 3D volume.

These and other advantages of the invention will be apparent to those of ordinary skill in the art by reference to the following detailed description and the accompanying drawings.

DETAILED DESCRIPTION

The present invention is directed to a method and system for segmentation and removal of pulmonary arteries (PA), pulmonary veins (PV), and the left atrial appendage (LAA) from 3D medical images, such as 3D computed tomography (CT) volumes, in order to visualize coronary arteries and bypass arteries. Embodiments of the present invention are described herein to give a visual understanding of the segmentation methods. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
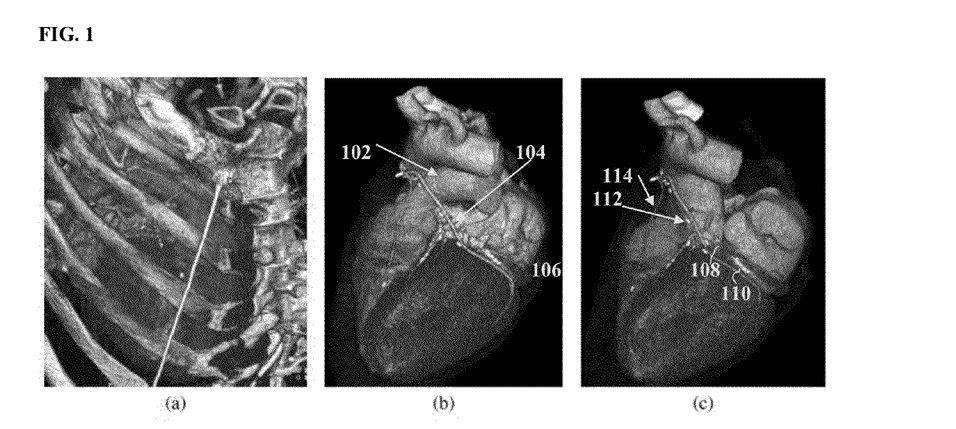
FIG. 1 illustrates exemplary results of heart isolation visualization and removal of the pulmonary arteries (PA), pulmonary veins (PV), and left atrial appendage (LAA) according an embodiment of the present invention.

Various algorithms have been developed to isolate the heart from surrounding structures, such as the lungs, spine, and sternum, in a 3D CT volume. However, heart structures like the PA, PV, and LAA may still partially occlude the coronary arteries in the isolated heart visualization. Embodiments of the present invention segment these structures and remove them from a cardiac CT image such that physicians can easily visualize the coronary arteries. FIG. 1 illustrates exemplary results of heart isolation visualization and removal of the PA, PV, and LAA according to an embodiment of the present invention. As illustrated in FIG. 1, image (a) shows a raw CT scan image of a cardiac region. In the raw CT scan image, ribs, sternum, and other structures totally block any view of the heart. Image (b) shows a cardiac CT image extracted from the raw CT scan image of image (a) using a heart isolation algorithm. The heart isolation algorithm automatically isolates the heart from surrounding structures. With this result, physicians can easily see the detailed heart structures. However, the PA 102, LAA 104, and PV 106 still occlude the left coronary artery (LCA) 108 in the heart isolation image. Image (c) shows the result of removing the PA 102, LAA 104, and PV 106 using a method according to an embodiment of the present invention. As shown in image (c), the LCA 108 can be clearly seen without any occlusion. Furthermore, plaques 110 that block the LCA 108 can be easily identified. There are two bypass arteries 112 and 114 in the example of FIG. 1, and the PA, PV, and LAA segmentation and removal method reliably keeps them intact.

Figure 2:
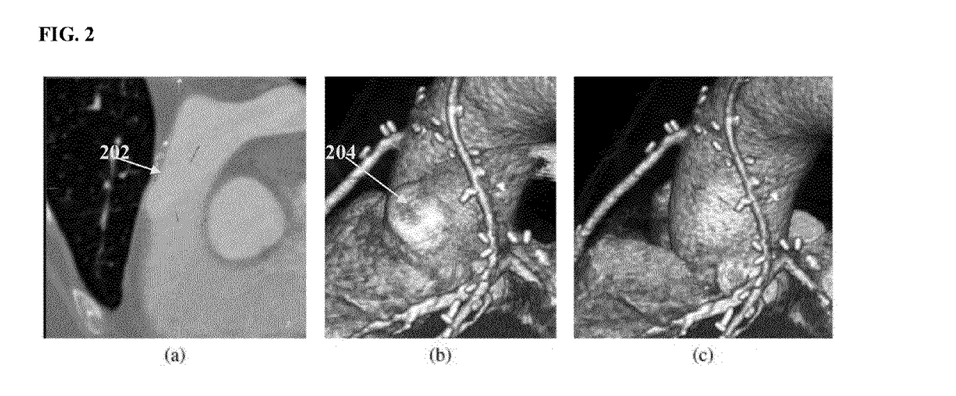
FIG. 2 illustrates exemplary results of segmenting the PA root by directly applying machine-learning based segmentation.

U.S. Pat. No. 7,916,919 describes a method for segmenting chambers of the heart using a Marginal Space Learning (MSL) based segmentation framework. However, the LAA, PA, and PV cannot be easily segmented to voxel-level accuracy using such a machine-learning based segmentation framework alone. For the PA and PV, their shapes and topologies are much more complex than the heart chambers and cannot be easily modeled by a simple tubular model. Even for the root section of the PA, which can be modeled as a tubular mesh model, it is difficult for such an approach to achieve voxel-level accuracy. Thus, in the final 3D volumetric visualization, remaining small pieces of the PA can cause highly noticeable artifacts. FIG. 2 illustrates exemplary results of segmenting the PA root by directly machine-learning based segmentation. As illustrated in FIG. 2, image (a) shows a tubular mesh 202 representing the segmented PA root and image (b) shows a heart isolation image after the segmented PA root is removed. Even though the mesh 202 looks accurate in image (a), a thin layer of the PA 204 remains in the heart isolation image of image (b). That is because the mesh model's resolution cannot capture the voxel-level details of the shape of the PA root. Image (c) shows heart isolation after removal of the PA using an embodiment of the present invention. As shown in image (c), in the embodiment of the present invention, a clean mask of the PA is created for removal of the PA and no portion of the PA remains in the heart isolation image.

Local voxel-intensity-based region growing algorithms can be used to generate a detailed mask of an object. However, without any global shape model constraint, such region growing algorithms tend to leak into neighboring objects when the neighboring objects are touching each other and have similar intensity. This is exactly the case for the PA and LAA where they neighbor the LCA. In addition some bypass arteries lie very close to these structures and may adversely affect region growing as well.

Embodiments of the present invention combine local region growing with global shape models in order to accurately segment the PA, PV, and LAA for heart isolation. Embodiments of the present invention use a machine learning algorithm to learn a global shape model, either mesh based or fiducial control point based, to locate the approximate locations and orientation of the object (PA, PV, LAA) being segmented. Then, constrained local intensity based region growing algorithms are used to refine the shape and generate a detailed mask. In order to avoid any removal of the CA, aorta, or other important structures, embodiments of the present invention also use a model-based algorithm to create "protection" zones for such structures where no removal can happen to protected objects. The result is a fully automatic, efficient, and clean removal of the PA, PV, and PAA for 3D visualization of the coronary arteries.

Figure 3:
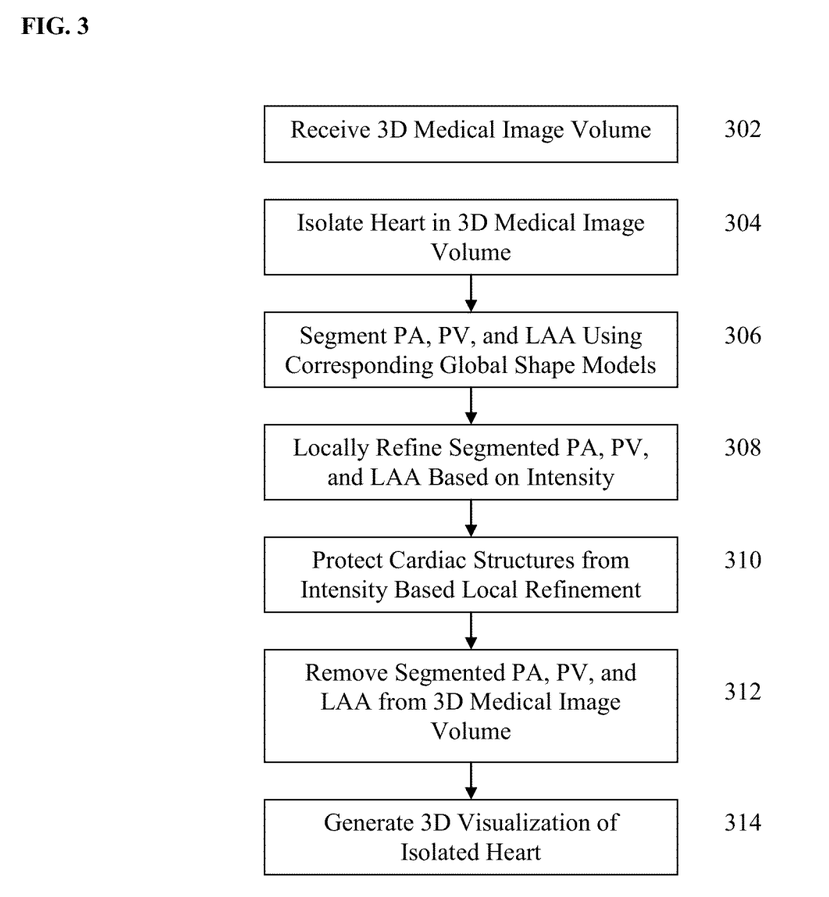
FIG. 3 illustrates a method for segmentation and removal of the PA, PV, and LAA for visualizing the coronary arteries in a 3D medical image volume according to an embodiment of the present invention.

FIG. 3 illustrates a method for segmentation and removal of the PA, PV, and LAA for visualizing the coronary arteries in a 3D medical image volume according to an embodiment of the present invention.

At step 302, a 3D medical image volume is received. For example, a 3D computed tomography (CT) volume can be received, but the present invention is not limited thereto and can be similarly applied to any imaging modality, such as magnetic resonance imaging (MRI), ultrasound, etc. The 3D volume can be received directly from an image acquisition device, such as a CT scanner, or the 3D volume can be received by loading a previously stored 3D volume from a storage or memory of a computer system.

At step 304, the heart is isolated in the 3D volume. The heart is isolated from surrounding structures, such as the lungs, spine, and sternum, in the 3D volume using a heart isolation algorithm. For example, the heart can be isolated in the 3D volume using the method described in United States Published Patent Application 2012/0134564, which is incorporated herein by reference. This heart isolation method first extracts an initial heart isolation mask from the 3D volume. An aortic root and an ascending aorta are then segmented in the 3D volume, resulting in an aorta mesh, and the aorta mesh is expanded to include bypass coronary arteries. An expanded heart isolation mask is generated by combining the initial heart isolation mask with an expanded aorta mask defined by the expanded aorta mesh. The expanded heart isolation mask can be used to remove all voxels in the 3D volume not within the expanded mask in order to isolate the heart, including the bypass arteries.

At step 306, the PA, PV and LAA are each initially segmented using a corresponding global shape model. The PA, PV, and LAA can each be segmented in the originally received 3D volume or can be segmented in the 3D volume after the heart has been isolated by removing voxels not within the heart isolation mask. A respective global shape model for each one of the PA, PV, and LAA is trained offline based on annotated training data. Each one of the PA, PV, and LAA is independently segmented by estimating the pose of the corresponding global shape model in the 3D volume.

Figure 4:
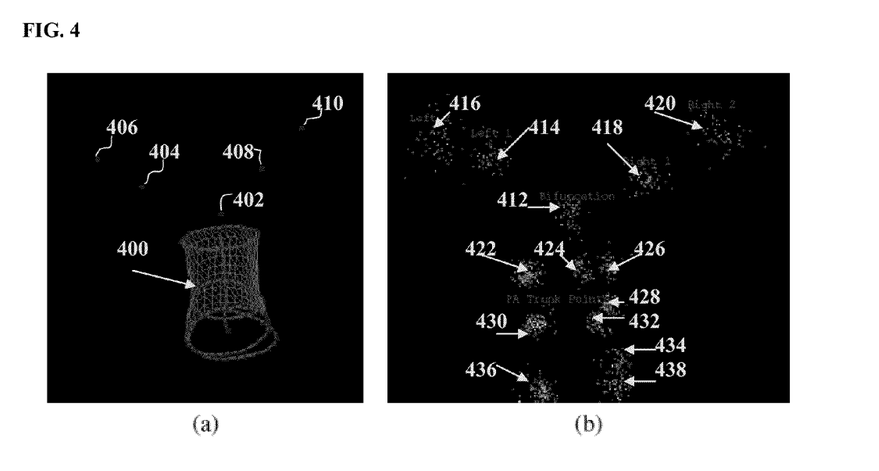
FIG. 4 illustrates the global shape model for the PA according to an embodiment of the present invention.

The global shape model for the PA includes a mesh and a set of fiducial control points. The PA trunk root, which is the portion of the PA from the right ventricle (RV) to the bifurcation, is modeled as a tubular mesh. From the bifurcation, it is difficult to approximate the shape of the PA with a tube. In an advantageous embodiment, the five fiducial control points are used to represent the remaining portion of the PA: one control point at the bifurcation, two control points at the left PA, and two control points at the right PA. It is to be understood that although an advantageous implementation in which the PA global shape model has five fiducial control points as described herein, the present invention is not limited to using five fiducial control points. FIG. 4 illustrates the global shape model for the PA according to an embodiment of the present invention. As illustrated in FIG. 4, image (a) shows the global shape model including the PA trunk root mesh 400 and the five fiducial control points 402, 404, 406, 408, and 410. Control point 402 is at the bifurcation, control points 404 and 406 are at predetermined points along the left PA, and control points 408 and 410 are at predetermined points along the right PA.

The PA trunk mesh can be segmented in the 3D volume using MSL-based segmentation. This segmentation can be constrained by the detected aorta (AO) and left atrium (LA) locations to reduce search regions and possible errors. The segmentation results in the detection of a bounding box having a set of affine parameters, and a statistical shape model (mesh) of the PA trunk trained offline based on annotated training is fit within the detected bounding box. The idea of MSL-based 3D object detection is not to learn a monolithic classifier directly in the full similarity transformation parameter space but to incrementally learn classifiers on marginal spaces. In particular, the detection of a 3D object can be split into three problems: position estimation, position-orientation estimation, and position-orientation-scale estimation. A separate classifier is trained based on annotated training data for each of these estimation problems. The classifiers in the lower dimensional marginal spaces are used to prune the searching space efficiently, such that all hypotheses in a high dimensional search space are generated from candidates detected with a high probability in a lower dimensional search space. This object localization results in an estimated transformation (position, orientation, and scale) of the object (e.g., the PA trunk mesh). After automatic object localization, the mean shape model of the object (learned from annotated training data) is aligned with the estimated transformation to get a rough estimate of the object shape. The shape is then deformed locally to fit the object boundary using a learning based boundary detector. Additional details regarding MSL-based segmentation are described in U.S. Pat. No. 7,916,919, issued Mar. 29, 2011, and entitled "System and Method for Segmenting Chambers of a Heart in a Three Dimensional Image", which is incorporated herein by reference.

The five fiducial points are trained based on annotated training data. The detection of the five fiducial points in the 3D volume is implemented using a mixture of a statistical shape model and individual trained fiducial point detectors using MSL-based segmentation. The reason for this mixture is that in some cardiac scans, some fiducial points are not located inside the scan or are located very close to the border of the scan. Thus, the MSL detector may fail for such fiducial points and select wrong locations as the detection results. However, the statistical shape model can handle such cases well. According to an advantageous embodiment of the present invention, a statistical shape model is constructed containing a number of PA trunk points selected from the PA trunk mesh and the five fiducial points. In an advantageous implementation, nine PA trunk points selected from the PA trunk mesh are used in the statistical shape model. Image (b) of FIG. 4 shows a statistical shape model learned based on annotated training data for the fiducial control points 412 (bifurcation), 414 (left 1), 416 (left 2), 418, (right 1), and 420 (right 2). As shown in image (b), nine PA trunk points 422, 424, 426, 428, 430, 432, 434, 436, and 438 are selected from the PA trunk mesh and combined with the five fiducial control points 412, 414, 416, 418, and 420 to construct the statistical shape model.

When the PA trunk is detected in the 3D volume, the PA trunk points (e.g., nine PA trunk points) in the statistical shape model are extracted from the detected mesh. The learned statistical shape model is then used to estimate the optimal location of the five fiducial control points based on the locations of the PA trunk points in the 3D volume. In particular, the learned statistical shape model is transformed to the 3D volume using transformation calculated to optimally transform the nine PA trunk points in the statistical shape model to their corresponding locations in the 3D volume. The transformed statistical shape model gives the estimated optimal positions of the five fiducial control points. The statistical shape model can estimate the location of a fiducial point even if the fiducial point is outside of the volume. In an advantageous embodiment, nine PA trunk points are selected instead of all of the PA trunk points so that the statistical shape model can capture variations for both the PA trunk and the left and right PA in a balanced manner. If all of the PA mesh points are included in the statistical shape model, the statistical shape model will be dominated by the shape variations of the PA trunk, which would lead to less accurate estimations of the left and right PA. Similarly, if too few PA trunk points are included in the statistical shape model, the statistical shape model will be dominated by the shape variations of the left and right PA. The present inventors have determined that nine PA trunk points works well for providing accurate segmentation, but the present invention is not limited thereto.

After the positions of the fiducial control points in the 3D volume are estimated using the statistical shape model, trained MSL-based detectors are used to refine each of the estimated fiducial control points. In particular, for each fiducial control point, a respective trained MSL-based detector searches an area constrained to a neighborhood of the current estimated location for a bounding box defining the location of the fiducial control point. If an MSL-based detector fails because a fiducial control point is too close to or out of an image border, the statistical shape model result will be used as the final detection result for that fiducial control point. Otherwise, the MSL-based detector's result will be used.

The shape of the PV varies too much to be fit with a single mesh model. Instead, embodiments of the present invention use two fiducial control points on the detected LA mesh model to locate the root of the left pulmonary veins and the root of the right pulmonary veins. These two points correspond to specified vertices on the LA mesh. The LA mesh is detected in the 3D volume using MSL-based segmentation. The two fiducial control points used as the global shape model of the PV are located in the 3D volume at the corresponding vertices of the segmented LA mesh.

A mesh that captures the outer boundary of the LAA is used as the global shape model for the LAA. Such a mesh model that captures the outer boundary of the LAA is learned offline from annotated training data. The LAA boundary is segmented in the 3D image by estimating the pose (position, orientation, and scale) of the LAA mesh model in the 3D image using MSL-based segmentation, similar to the heart chamber segmentation described in U.S. Pat. No. 7,916,919. However, the LAA's shape varies much more than any of the heart chambers, both for its topology and size, and this mesh model cannot typically capture the exact boundary of the LAA. The segmented LAA mesh serves as an initial estimation and constraint for the following local intensity-based refinement of step 308.

Returning to FIG. 3, at step 308, the segmented PA, PV, and LAA are each locally refined based on intensity. As described above, the global shape models used for the initial segmentation in step 306 for each of the PA, PV, and LAA cannot typically generate an exact voxel mask for those structures. Accordingly, local refinement is necessary for each of the PA, PV, and LAA. Different refinement algorithms can be used for each of the PA, PV, and LAA.

For the PA, the global shape model includes two parts: the PA trunk mesh and the five fiducial control points. For the PA trunk mesh, the openings of the mesh are closed, and a PA trunk mask is generated including all voxels inside the mesh. The mask is used to remove the PA trunk voxels from the 3D volume. As described above and shown in image (b) FIG. 2, a thin layer of the PA may still remain to be removed when the mask is generated based on the mesh alone. Region growing is then used to dilate the mask outwards for 2-3 millimeters depending on the image resolution. The region growing threshold is determined by the mean and standard deviation of the voxels already in the mask. Using the mean and standard deviation of the voxels already in the mask to determine the region growing threshold enables the region growing to be effective for the PA with or without contrast agent. By applying the region growing to the PA trunk mask, the thin layer of the PA remaining outside of the mask generated from the PA trunk mesh can be successfully removed. For left PA, right PA, and the PA bifurcation, region growing is initiated from each of the five fiducial control points. The region growing from each fiducial control point is limited to a particular range. For example, in an advantageous embodiment the region growing from each of the five fiducial control points is limited to a range of 15 mm. Since the PA fiducial control points are typically less than 15 mm apart from each other, the region growing can effectively fill the PA bifurcation region, the left PA, and the right PA and generate a voxel-level accurate mask. It can be noted that the region growing method tends to leak into surrounding objects as it only relies on the local information. In order to prevent any bypass arteries or the LCA, which are very close to the PA, from being removed due to such "leaks", embodiments of the present invention utilize a model-based protection method which is described below in connection with step 310 of FIG. 3.

For the PV, a mask is generated by applying region growing at each of the two fiducial control points corresponding to the left PV and the right PV, respectively, and limited to a particular range (e.g., 15 mm) from each fiducial control point, similar to the region growing applied at each of the PA fiducial control points. In an advantageous implementation, the intensity threshold for region growing at the PV control points is determined based on the mean and standard deviation of the voxels inside the detected LA mesh model.

The LAA is more complex than the PA and the PV. First, the segmented LAA mesh model only gives an approximate boundary, which may not cover the whole LAA and may include some of the LCA or other structures. Second, there are usually some small chambers in the LAA, which look like isolated bright structures in images. These small chambers in the LAA make it so the LAA is not a single connected region. To deal with these challenges, an advantageous embodiment of the present invention utilizes the following method that includes two passes of connected component analysis (CCA) for locally refining the detected LAA mesh. The CCA used in this method detects connected regions of voxels in an image or image patch based on intensity. The LAA mesh is detected (at step 306). The detected LAA mesh provides an initial estimation of the location and shape of the LAA. Based on the detected LAA mesh, a bounding box is generated that is larger than the LAA mesh by a predetermined amount to ensure that the whole LAA region is included in the bounding box, as the LAA mesh may be smaller than the actual LAA region in the 3D volume. A first CCA pass is run within the bounding box and the largest connected region is removed (or added to an LAA mask of voxels to be removed from the 3D image). It can be assumed that the largest connected component within the bounding box is the largest chamber of the LAA. However, smaller isolated chambers may still remain and they are difficult to distinguish from LCA pieces within the bounding box. A second CCA pass is then run on the whole image. The LCA pieces in the LAA bounding box in this pass will be connected to the whole LCA tree and eventually to the aorta and the left ventricle (LV). Thus, the LCA pieces within the bounding box will form a large connected region over the whole image. Accordingly, small connected regions that are only within the bounding box are removed (or added to the LAA mask of voxels to be removed from the 3D image). Since such small connected regions are only within the bounding box, it can be assumed that they are not pieces of the LCA and are thus the smaller chambers of the LAA.

Figure 5:
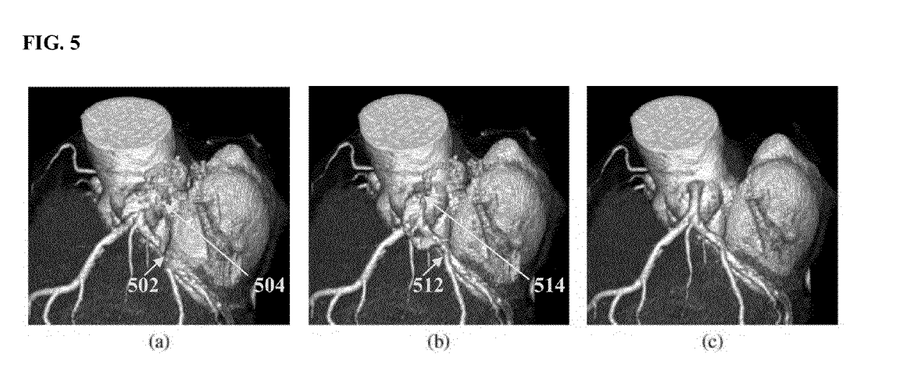
FIG. 5 illustrates exemplary results of removing the LAA voxels.

FIG. 5 illustrates exemplary results of removing the LAA voxels using the above described method for locally refining the LAA mesh. Image (a) of FIG. 5 shows removal of LAA voxels based only on the detected LAA mesh model. As shown in image (a), a portion of the LCA 502 is cut while a portion of the LAA 504 is not removed. Image (b) shows removal of the LAA voxels after the first pass of the connected component analysis. As shown in image (b), only the largest connected region in the bounding box of the LAA is removed. The LCA 512 is intact, however, some isolated regions 514 of the LAA remain. Image (c) shows removal of LAA voxels after the second pass of the connected component analysis. As shown in image (a), the second pass of the connected component analysis results in a clean removal of all LAA voxels.

Returning to FIG. 3, at step 310, certain cardiac structures are protected from the intensity based local refinement of the segmented PA, PV, and LAA. Sometimes important cardiac structures, such as the aorta (AO), left atrium (LA), or coronary arteries (CA) are masked for removal as a result of the local refinement of the segmented PA, PV, and LAA. To prevent this from happening, various measures can be used to protect these structures. First, the AO and LA can be segmented. The LA can be segmented using MSL-based segmentation, as described above. The aorta can be segmented using the part-based aorta segmentation method described in United States Publication No. 2010/0239148, which is incorporated herein by reference. AO and LA are then marked as not possible to grow by the region growing algorithms for the PV and PA and are excluded from the connected component analysis for the LAA.

It is more difficult to protect the CA and bypass arteries since they are small and typically very close to the PA, PV, and LAA. Embodiments of the present invention utilize a machine-learning based vesselness protection mask to protect the CA and bypass arteries. In particular, a vesselness classifier is trained based the image context surrounding voxels within coronary arteries and bypass arteries in annotated training data. For example, the vesselness classifier may be trained using a probabilistic boosting tree (PBT) classifier. The trained vesselness classifier classifies a voxel as being within a vessel or not based on the image context of that voxel. Although the trained classifier is very fast to classify each voxel, in order to increase efficiency, the classifier may be constrained to a search region of the image around the PA trunk, LAA, and PVs where cutting of the CA or bypass arteries is most likely. For the bypass arteries near the PA trunk mesh, any voxels within a certain distance (e.g., 3 mm) of the PA trunk can be classified for vesselness using the trained classifier. In order to efficiently identify the LCA region around the LAA and PV, a fiducial point model, similar to the fiducial point model of the PA described above, can be generated. The fiducial point model can include the left coronary ostium point, the point where the left main (LM) coronary artery bifurcates into the left anterior descending (LAD) coronary artery and the left circumflex (LCX) coronary artery, a number of control points (e.g., 20) along the LCX, and a number of points (e.g., 20) selected from the LA mesh. A statistical shape model for these points is trained based on annotated training data. During detection, the points from the LA mesh, the detected coronary ostium, and the detected bifurcation point are used to estimate the position of the control points along the LCX. The vesselness classification is then run in a region around this estimated LCA tree. After vesselness classification, a vessel protection mask is generated. The vessel protection mask includes any voxels classified as vessels by the vesselness classifier. The region growing algorithms for the PA and the PV are enforced not to grow into any vessel voxels, and the connected component analysis for the LAA will exclude vessel voxels for removal. This vesselness protection method can preserve the LCA, RCA, and bypass arteries.

Figure 6:
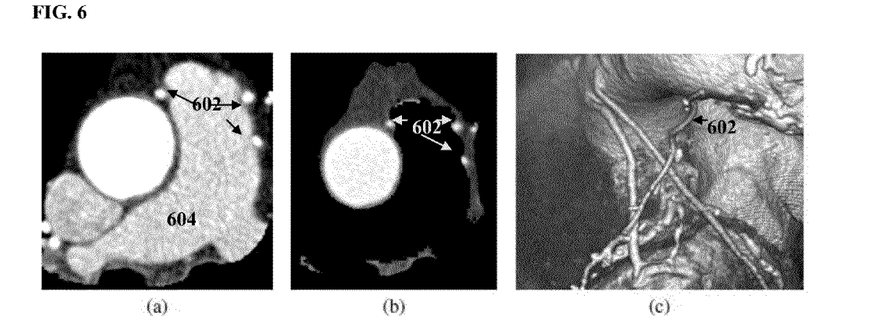
FIG. 6 illustrates exemplary protection of vessels while removing the PA.

FIG. 6 illustrates exemplary protection of vessels while removing the PA. Image (a) of FIG. 6 shows an example in which bypass arteries 602 are deeply embedded in the PA 604. Image (b) illustrates results of removing the PA using region growing constrained by vesselness classification. As shown in image (b), the voxels of the bypass arteries 602 remain. Image (c) shows a 3D visualization in which the bypass arteries 602 are intact and clearly visible.

Returning to FIG. 3, at step 312, the segmented PA, PV, and LA are removed from the 3D medical image volume. In particular, voxels included in the PA, PV, and LA masks generated during the local refinement are removed from the 3D volume. In particular after all voxels not included in the heart isolation mask are removed from the originally received 3D volume, the voxels included in the PA, PV, and LA masks are removed from the 3D volume. It is to be understood that, although the removal of the segmented PA, PV, and LA is shown in FIG. 3 as a separate method step, the removal of these voxels may occur during the local refinement of step 308 while enforcing the protections of step 310.

Figure 7:
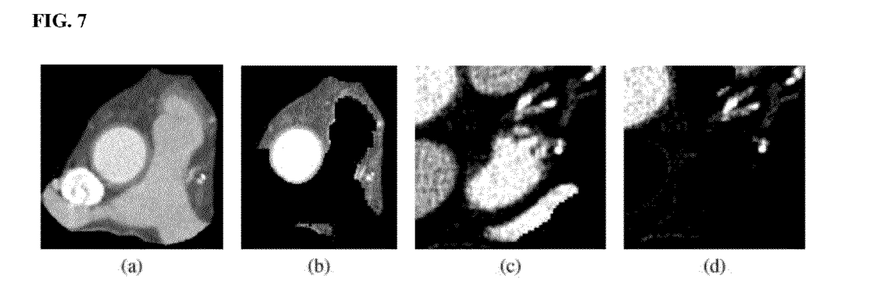
FIG. 7 illustrates exemplary removal of the PA, PV, and LAA based on the local refinement.

FIG. 7 illustrates exemplary removal of the PA, PV, and LAA based on the local refinement. As illustrated in FIG. 7, image (a) shows the PA before removal and image (b) shows that the PA is removed while a bypass artery adjacent to the PA is kept intact. Image (c) shows the small isolated chambers of the LAA before removal and image (d) shows that the LAA and PV are removed cleanly while the LCA is intact.

Figure 8:
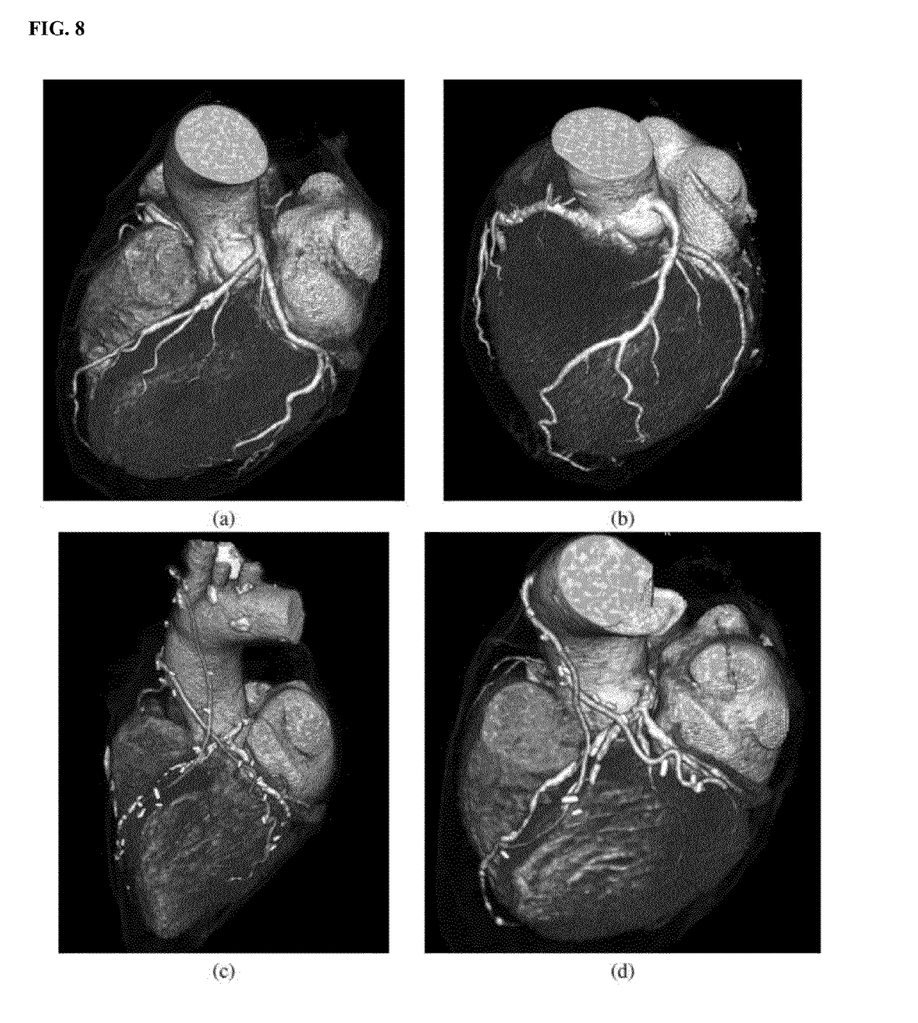
FIG. 8 illustrates exemplary 3D visualizations with removed PA, PV, and LAA.

Returning to FIG. 3, at step 314, a 3D visualization of the isolated heart is generated. In particular, once the PA, PV, and LAA are removed a 3D visualization of the isolated heart can be generated to provide clear visualization of the coronary arteries and the bypass arteries. The 3D visualization can be output, for example by displaying the 3D visualization on a display device of a computer system. FIG. 8 illustrates exemplary 3D visualizations with removed PA, PV, and LAA. Images (a) and (b) of FIG. 8 show exemplary 3D visualizations for normal cases and images (c) and (d) show exemplary 3D visualizations for bypass cases.

Figure 9:
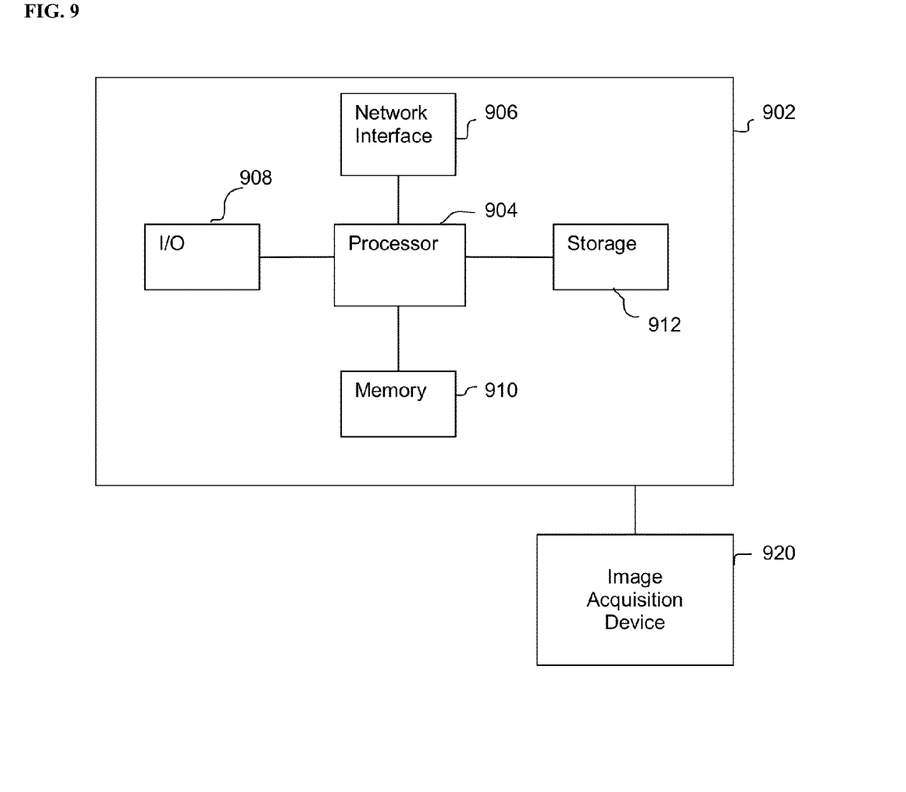
FIG. 9 is a high level block diagram of a computer capable of implementing the present invention.

The above-described methods for segmentation and removal of pulmonary arteries, pulmonary veins, and the left atrial appendage in 3D medical image volumes may be implemented on a computer using well-known computer processors, memory units, storage devices, computer software, and other components. A high level block diagram of such a computer is illustrated in FIG. 9. Computer 902 contains a processor 904 which controls the overall operation of the computer 902 by executing computer program instructions which define such operation. The computer program instructions may be stored in a storage device 912, or other computer readable medium (e.g., magnetic disk, CD ROM, etc.) and loaded into memory 910 when execution of the computer program instructions is desired. Thus, the steps of the method of FIG. 3 may be defined by the computer program instructions stored in the memory 910 and/or storage 912 and controlled by the processor 904 executing the computer program instructions. An image acquisition device 920, such as a CT scanner, can be connected to the computer 902 to input images to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.). One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of segmenting at least one of a pulmonary artery, a pulmonary vein and a left atrial appendage in a 3D volume, comprising:
    segmenting at least one of a pulmonary artery shape model, a pulmonary vein shape model, or a left atrial appendage shape model in the 3D volume, wherein segmenting at least one of a pulmonary artery shape model, a pulmonary vein shape model, or a left atrial appendage shape model in the 3D volume comprises at least one of:
        segmenting the pulmonary artery model in the 3D volume, wherein the pulmonary artery model includes a pulmonary artery trunk mesh and a plurality of fiducial control points representing a pulmonary artery bifurcation, a left pulmonary artery, and a right pulmonary artery,
        segmenting the pulmonary vein shape model in the 3D volume, wherein the pulmonary vein shape model includes a first fiducial control point located at a root of a left pulmonary vein and a second fiducial control point located at a root of a right pulmonary vein, or
        segmenting the left atrial appendage shape model in the 3D volume, wherein the left atrial appendage shape model comprises a left atrial appendage mesh representing an outer boundary of the left atrial appendage; and
    generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume.

2. The method of claim 1, further comprising:
    removing voxels included in the at least one of a pulmonary artery mask, a pulmonary vein mask, and a left atrial appendage mask from the 3D volume.

3. The method of claim 1, further comprising:
    protecting one or more cardiac structures being included in the at least one of a pulmonary artery mask, a pulmonary vein mask, and a left atrial appendage mask based on the local refinement of the segmented at least one of a pulmonary artery shape model, a pulmonary vein shape model, and a left atrial appendage shape model.

4. The method of claim 1, wherein the step of segmenting at least one of a pulmonary artery shape model, a pulmonary vein shape model, or a left atrial appendage shape model in the 3D volume comprises:
    segmenting the pulmonary artery model in the 3D volume, wherein the pulmonary artery model includes the pulmonary artery trunk mesh and the plurality of fiducial control points representing the pulmonary artery bifurcation, the left pulmonary artery, and the right pulmonary artery.

5. The method of claim 4, wherein the plurality of fiducial control points in the pulmonary artery model includes one fiducial control point located at the pulmonary artery bifurcation, two fiducial control points located along the left pulmonary artery, and two fiducial control points located along the right pulmonary artery.

6. The method of claim 4, wherein the step of segmenting the pulmonary artery model in the 3D volume, wherein the pulmonary artery model includes the pulmonary artery trunk mesh and the plurality of fiducial control points representing the pulmonary artery bifurcation, the left pulmonary artery, and the right pulmonary artery, comprises:
   segmenting the pulmonary artery trunk mesh in the 3D volume using marginal space learning (MSL) based segmentation;
   estimating locations of the plurality of fiducial control points in the 3D volume based on a plurality of pulmonary artery trunk points in the segmented pulmonary artery trunk mesh using a learned statistical shape model; and
   detecting each of the plurality of fiducial control points in the 3D volume using MSL-based segmentation in a neighborhood of the respective estimated location.

7. The method of claim 4, wherein the step of generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
   generating the pulmonary artery mask by:
      closing openings of the pulmonary artery trunk mesh;
      dilating a boundary of the pulmonary artery trunk mesh outwards using region growing based on voxel intensities; and
      performing region growing based on voxel intensities from each of the plurality of fiducial control points, wherein the region growing from each of the plurality of fiducial control points is limited to a predetermined range, wherein the pulmonary artery mask includes voxels within the dilated boundary of the pulmonary artery trunk mesh and voxels within regions resulting from the region growing from each of the plurality of fiducial points.

8. The method of claim 7, further comprising:
   segmenting an aorta in the 3D volume;
   segmenting a left atrium in the 3D volume;
   generating a vessel protection mask by classifying voxels in the 3D volume using a trained vesselness classifier; and
   preventing the region growing of the boundary of the pulmonary artery trunk mesh and the region growing from each of the plurality of fiducial control points from growing into any voxels included in the segmented aorta, the segmented left atrium, or the vessel protection mask.

9. The method of claim 1, wherein the step of segmenting at least one of a pulmonary artery shape model, a pulmonary vein shape model, or a left atrial appendage shape model in the 3D volume comprises:
   segmenting the pulmonary vein shape model in the 3D volume, wherein the pulmonary vein shape model includes the first fiducial control point located at the root of a left pulmonary vein and the second fiducial control point located at the root of a right pulmonary vein.

10. The method of claim 9, wherein the step of segmenting the pulmonary vein shape model in the 3D volume, wherein the pulmonary vein shape model includes the first fiducial control point located at a the root of the left pulmonary vein and the second fiducial control point located at the root of the right pulmonary vein comprises:
   segmenting a left atrium mesh in the 3D volume; and
   detecting the first and second fiducial control points at predetermined vertices of the left atrium mesh in the 3D volume.

11. The method of claim 9, wherein the step of generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
   generating the pulmonary vein mask by performing region growing based on voxel intensities from each of the first and second fiducial control points, wherein the region growing from each of the first and second fiducial control points is limited to a predetermined range.

12. The method of claim 11, further comprising:
   segmenting an aorta in the 3D volume;
   generating a vessel protection mask by classifying voxels in the 3D volume using a trained vesselness classifier; and
   preventing the region growing from each of the first and second fiducial control points from growing into any voxels included in the segmented aorta, the segmented left atrium mesh, or the vessel protection mask.

13. The method of claim 1, wherein the step of segmenting at least one of a pulmonary artery shape model, a pulmonary vein shape model, or a left atrial appendage shape model in the 3D volume comprises:
   segmenting the left atrial appendage shape model in the 3D volume, wherein the left atrial appendage shape model comprises the left atrial appendage mesh representing the outer boundary of the left atrial appendage.

14. The method of claim 13, wherein the step of segmenting the left atrial appendage shape model in the 3D volume, wherein the left atrial appendage shape model comprises the left atrial appendage mesh representing the outer boundary of the left atrial appendage comprises:
   segmenting the left atrial appendage mesh using marginal space learning (MSL) based segmentation.

15. The method of claim 13, wherein the step of generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
   generating the left atrial appendage mask by:
      expanding a bounding box enclosing the left atrial appendage mesh by a predetermined amount;
      performing a first pass of connected component analysis within the bounding box to detect connected components within the bounding box based on voxel intensities;
      adding voxels belonging to a largest connected component to the left atrial appendage mask;
      performing a second pass of connected component analysis on a portion of the 3D image larger than the bounding box to detect connected components in the portion of the 3D image based on voxel intensities; and
      adding voxels belonging to connected components resulting from the second pass of connected component analysis that are entirely within the bounding box to the atrial appendage mask.

16. The method of claim 15, further comprising:
segmenting an aorta in the 3D volume;
segmenting a left atrium in the 3D volume;
generating a vessel protection mask by classifying voxels in the 3D volume using a trained vesselness classifier; and
excluding any voxels included in the segmented aorta, the segmented left atrium, or the vessel protection mask from the first and second passes of connected component analysis.

17. An apparatus for segmenting at least one of a pulmonary artery, a pulmonary vein and a left atrial appendage in a 3D volume, comprising:
means for segmenting at least one of a pulmonary artery shape model, a pulmonary vein shape model, or a left atrial appendage shape model in the 3D volume, comprising at least one of:
means for segmenting the pulmonary artery model in the 3D volume, wherein the pulmonary artery model includes a pulmonary artery trunk mesh and a plurality of fiducial control points representing a pulmonary artery bifurcation, a left pulmonary artery, and a right pulmonary artery,
means for segmenting the pulmonary vein shape model in the 3D volume, wherein the pulmonary vein shape model includes a first fiducial control point located at a root of a left pulmonary vein and a second fiducial control point located at a root of a right pulmonary vein, or
means for segmenting the left atrial appendage shape model in the 3D volume, wherein the left atrial appendage shape model comprises a left atrial appendage mesh representing an outer boundary of the left atrial appendage; and
means for generating at least one of a pulmonary artery mask, a pulmonary vein mask, and a left atrial appendage mask by locally refining the segmented at least one of a pulmonary artery shape model, a pulmonary vein shape model, and a left atrial appendage shape model based in local voxel intensities on the 3D volume.

18. The apparatus of claim 17, further comprising:
means for protecting one or more cardiac structures being included in the at least one of a pulmonary artery mask, a pulmonary vein mask, and a left atrial appendage mask based on the local refinement of the segmented at least one of a pulmonary artery shape model, a pulmonary vein shape model, and a left atrial appendage shape model.

19. The apparatus of claim 17, wherein the means for segmenting at least one of a pulmonary artery shape model, a pulmonary vein shape model, or a left atrial appendage shape model in the 3D volume comprises the means for segmenting the pulmonary artery model in the 3D volume.

20. The apparatus of claim 19, wherein the means for generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
means for dilating a boundary of the pulmonary artery trunk mesh outwards using region growing based on voxel intensities; and
means for performing region growing based on voxel intensities from each of the plurality of fiducial control points.

21. The apparatus of claim 17, wherein the means for segmenting at least one of a pulmonary artery shape model, a pulmonary vein shape model, or a left atrial appendage shape model in the 3D volume comprises the means for segmenting the pulmonary vein shape model in the 3D volume, wherein the pulmonary vein shape model includes a first fiducial control point located at a root of a right pulmonary vein.

22. The apparatus of claim 21, wherein the means for generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
means for performing region growing based on voxel intensities from each of the first and second fiducial control points, wherein the region growing from each of the first and second fiducial control points is limited to a predetermined range.

23. The apparatus of claim 17, wherein the means for segmenting at least one of a pulmonary artery shape model, a pulmonary vein shape model, or a left atrial appendage shape model in the 3D volume comprises the means for segmenting the left atrial appendage shape model in the 3D volume.

24. The apparatus of claim 23, wherein the means for generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
means for expanding a bounding box enclosing the left atrial appendage mesh by a predetermined amount;
means for performing a first pass of connected component analysis within the bounding box to detect connected components within the bounding box based on voxel intensities;
means for adding voxels belonging to a largest connected component to the left atrial appendage mask;
means for performing a second pass of connected component analysis on a portion of the 3D image larger than the bounding box to detect connected components in the portion of the 3D image based on voxel intensities; and
means for adding voxels belonging to connected components resulting from the second pass of connected component analysis that are entirely within the bounding box to the atrial appendage mask.

25. A non-transitory computer readable medium storing computer program instructions for segmenting at least one of a pulmonary artery, a pulmonary vein and a left atrial appendage in a 3D volume, the computer program instructions when executed by a processor cause the processor to perform operations comprising:
segmenting at least one of a pulmonary artery shape model, a pulmonary vein shape model, or a left atrial appendage shape model in the 3D volume, wherein segmenting at least one of a pulmonary artery shape model, a pulmonary vein shape model, or a left atrial appendage shape model in the 3D volume comprises at least one of:
segmenting the pulmonary artery model in the 3D volume, wherein the pulmonary artery model includes a pulmonary artery trunk mesh and a plurality of fiducial control points representing a pulmonary artery bifurcation, a left pulmonary artery, and a right pulmonary artery, segmenting the pulmonary vein shape model in the 3D volume, wherein the pulmonary vein shape model includes a first fiducial control point located at a root of a left pulmonary vein and a second fiducial control point located at a root of a right pulmonary vein, or segmenting the left atrial appendage shape model in the 3D volume, wherein the left atrial appendage shape model comprises a left atrial appendage mesh representing an outer boundary of the left atrial appendage; and generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume.

26. The non-transitory computer readable medium of claim 25, wherein the operations further comprise:
removing voxels included in the at least one of a pulmonary artery mask, a pulmonary vein mask, and a left atrial appendage mask from the 3D volume.

27. The non-transitory computer readable medium of claim 25, wherein the operations further comprise:
protecting one or more cardiac structures being included in the at least one of a pulmonary artery mask, a pulmonary vein mask, and a left atrial appendage mask based on the local refinement of the segmented at least one of a pulmonary artery shape model, a pulmonary vein shape model, and a left atrial appendage shape model.

28. The non-transitory computer readable medium of claim 25, wherein the operation of segmenting at least one of a pulmonary artery shape model, a pulmonary vein shape model, or a left atrial appendage shape model in the 3D volume comprises:
segmenting the pulmonary artery model in the 3D volume, wherein the pulmonary artery model includes the pulmonary artery trunk mesh and the plurality of fiducial control points representing the pulmonary artery bifurcation, the left pulmonary artery, and the right pulmonary artery.

29. The non-transitory computer readable medium of claim 28, wherein the operation of segmenting the pulmonary artery model in the 3D volume, wherein the pulmonary artery model includes the pulmonary artery trunk mesh and the plurality of fiducial control points representing the pulmonary artery bifurcation, the left pulmonary artery, and the right pulmonary artery, comprises:
segmenting the pulmonary artery trunk mesh in the 3D volume using marginal space learning (MSL) based segmentation;
estimating locations of the plurality of fiducial control points in the 3D volume based on a plurality of pulmonary artery trunk points in the segmented pulmonary artery trunk mesh using a learned statistical shape model; and
detecting each of the plurality of fiducial control points in the 3D volume using MSL-based segmentation in a neighborhood of the respective estimated location.

30. The non-transitory computer readable medium of claim 28, wherein the operation of generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
generating the pulmonary artery mask by:
closing openings of the pulmonary artery trunk mesh;
dilating a boundary of the pulmonary artery trunk mesh outwards using region growing based on voxel intensities; and
performing region growing based on voxel intensities from each of the plurality of fiducial control points, wherein the region growing from each of the plurality of fiducial control points is limited to a predetermined range, wherein the pulmonary artery mask includes voxels within the dilated boundary of the pulmonary artery trunk mesh and voxels within regions resulting from the region growing from each of the plurality of fiducial points.

31. The non-transitory computer readable medium of claim 25, wherein the operation of segmenting at least one of a pulmonary artery shape model, a pulmonary vein shape model, or a left atrial appendage shape model in the 3D volume comprises:
segmenting the pulmonary vein shape model in the 3D volume, wherein the pulmonary vein shape model includes the first fiducial control point located at the root of the left pulmonary vein and the second fiducial control point located at the root of the right pulmonary vein.

32. The non-transitory computer readable medium of claim 31, wherein the operation of segmenting the pulmonary vein shape model in the 3D volume, wherein the pulmonary vein shape model includes the first fiducial control point located at the root of the left pulmonary vein and the second fiducial control point located at the root of the right pulmonary vein comprises:
segmenting a left atrium mesh in the 3D volume; and
detecting the first and second fiducial control points at predetermined vertices of the left atrium mesh in the 3D volume.

33. The non-transitory computer readable medium of claim 31, wherein the operation of generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
generating the pulmonary vein mask by performing region growing based on voxel intensities from each of the first and second fiducial control points, wherein the region growing from each of the first and second fiducial control points is limited to a predetermined range.

34. The non-transitory computer readable medium of claim 25, wherein the operation of segmenting at least one of a pulmonary artery shape model, a pulmonary vein shape model, or a left atrial appendage shape model in the 3D volume comprises:
segmenting the left atrial appendage shape model in the 3D volume, wherein the left atrial appendage shape model comprises the left atrial appendage mesh representing the outer boundary of the left atrial appendage.

35. The non-transitory computer readable medium of claim 34, wherein the operation of generating at least one of a pulmonary artery mask, a pulmonary vein mask, and a left atrial appendage mask by locally refining the segmented at least one of a pulmonary artery shape model, a pulmonary vein shape model, and a left atrial appendage shape model based on local voxel intensities in the 3D volume comprises:
generating the left atrial appendage mask by:
expanding a bounding box enclosing the left atrial appendage mesh by a predetermined amount;

performing a first pass of connected component analysis within the bounding box to detect connected components within the bounding box based on voxel intensities;

adding voxels belonging to a largest connected component to the left atrial appendage mask;

performing a second pass of connected component analysis on a portion of the 3D image larger than the bounding box to detect connected components in the portion of the 3D image based on voxel intensities; and adding voxels belonging to connected components resulting from the second pass of connected component analysis that are entirely within the bounding box to the atrial appendage mask.

* * * * *